(No Model.) 3 Sheets—Sheet 3.
H. L. BAILEY.
AUTOMATIC VEHICLE BRAKE.
No. 603,245. Patented May 3, 1898.
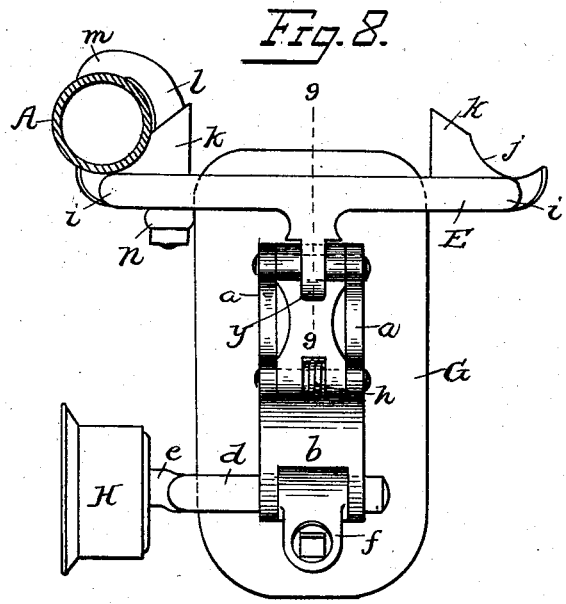
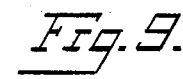
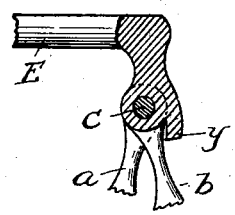
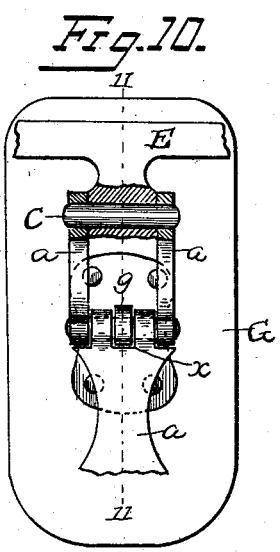
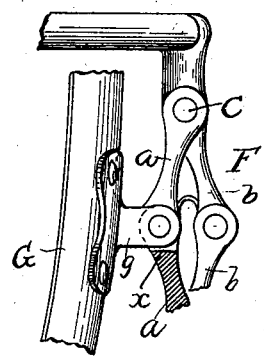
Witnesses.
Albert Popkins.
H. Joseph Doyle.
Inventor
Herbert L. Bailey
By Raymond Cushundro
Attorneys.

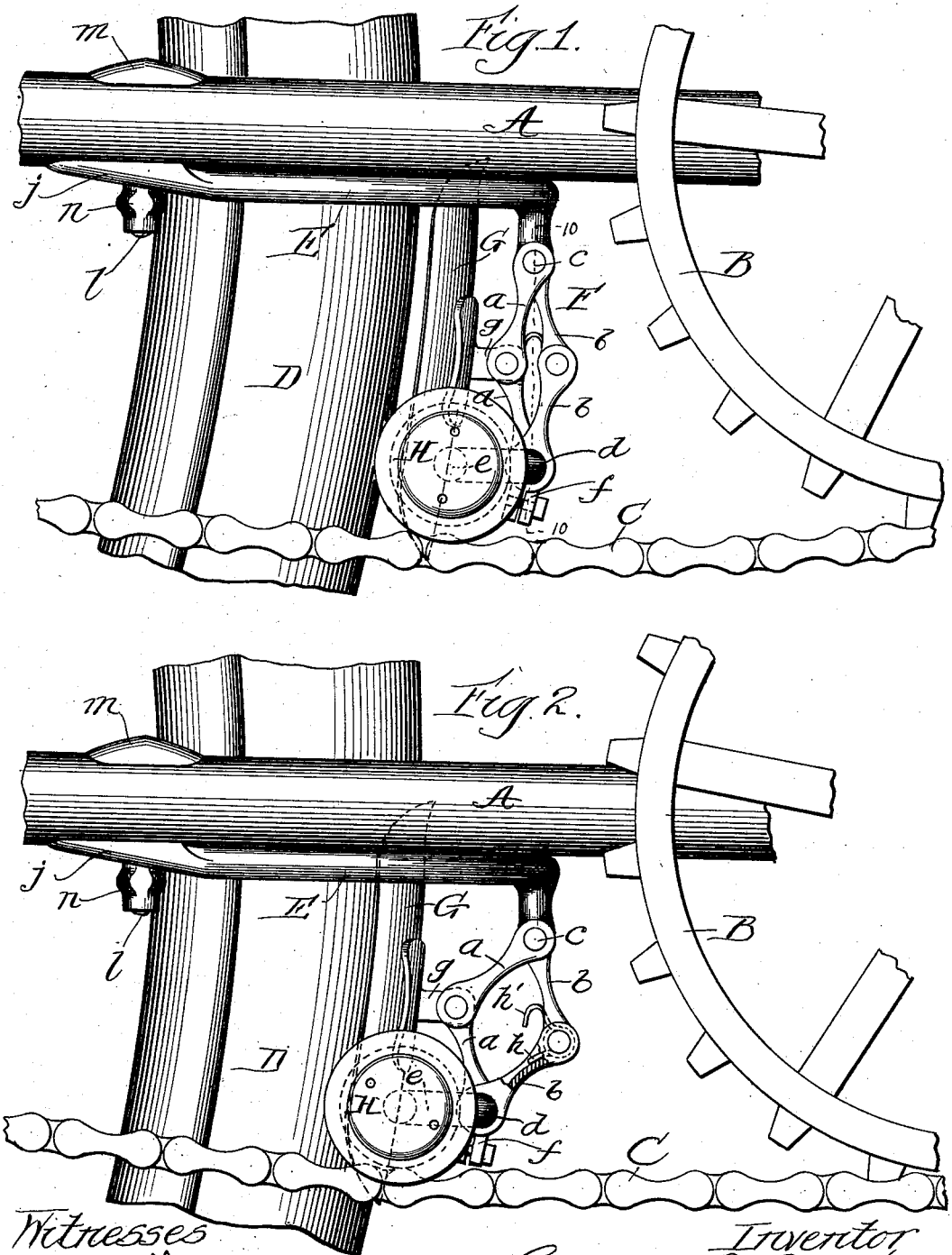

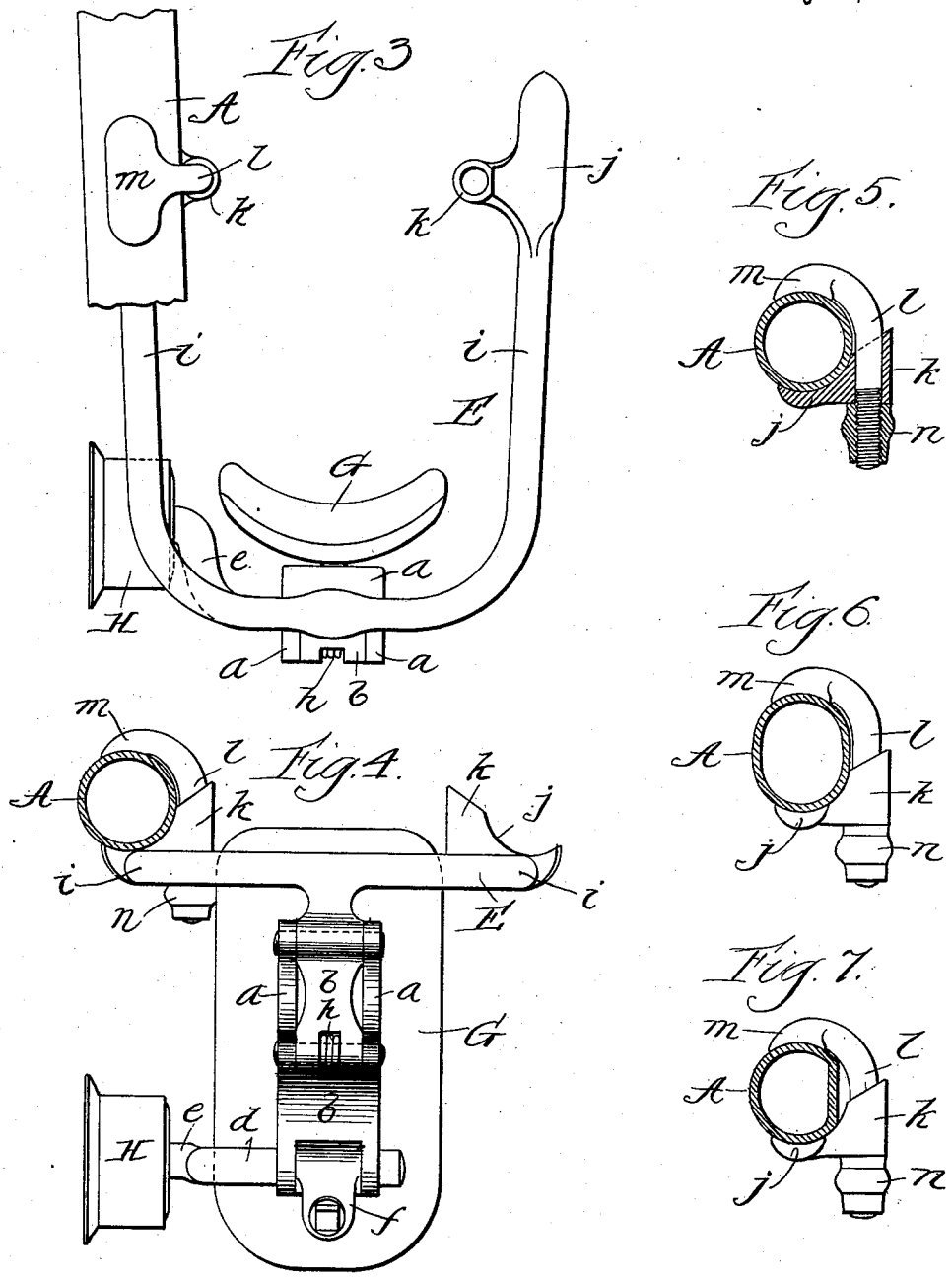

UNITED STATES PATENT OFFICE.

HERBERT L. BAILEY, OF CHICAGO, ILLINOIS, ASSIGNOR TO THE BAILEY MANUFACTURING COMPANY, OF SAME PLACE.

AUTOMATIC VEHICLE-BRAKE.

SPECIFICATION forming part of Letters Patent No. 603,245, dated May 3, 1898.

Application filed April 28, 1897. Serial No. 634,301. (No model.)

*To all whom it may concern:*

Be it known that I, HERBERT L. BAILEY, a citizen of the United States, residing at Chicago, in the county of Cook and State of Illinois, have invented certain new and useful Improvements in Automatic Vehicle-Brakes, of which the following is a full, clear, and exact description, reference being had to the accompanying drawings, forming a part of this specification.

This invention relates to improvements in that class of automatic vehicle-brakes exemplified in Letters Patent No. 517,996, dated April 10, 1894, and No. 555,720, dated March 3, 1896, issued to my assignee, the Bailey Manufacturing Company.

Practical experience has demonstrated the desirability of having the brake-spoon normally stand at a sufficient distance from the wheel-tire to avoid the possibility of clogging by the lodgment of mud and dirt between it and the tire. To secure this condition with the forms of brake exemplified in the above-mentioned Letters Patent, the driving-chain must have so much slack therein as to be objectionable to many riders, and while these prior forms of brakes are satisfactorily effective the above-mentioned objection, that of clogging, cannot be overcome except by a considerable slack in the chain. Furthermore, it is essential to a commercially-satisfactory brake as a bicycle accessory that it should be readily adapted for application to bicycles of all kinds, and by reason of the greater variations in other parts of the bicycle-frame the rear fork is the most desirable point for the attachment of the brake. While the rear forks of bicycles as now manufactured are made practically to a standard as to width and taper, there are still many slight variations in these respects, due in some cases to imperfection either of material or workmanship and in other cases to design. Again, it is desirable that the brake should be of such character that while it is prompt in action and will impart the maximum movement to the brake-spoon by the minimum lateral movement of the driving-chain the brake should not be so sensitive as to be applied upon slight back pressure on the pedals, but nevertheless should enable the application of the power with any desired force from the minimum to the maximum at the will of the operator, and should be noiseless whether in or out of action.

The primary object of my invention is an automatic brake that shall avoid all of the objections above mentioned and at the same time possess all of the desirable qualities enumerated.

Another object is to enable the application of the brakes with the minimum movement of the normally slack side of the driving-chain, whereby the brakes may be applied even with a "tight" chain having the least possible slack therein, although the maximum normal separation may be provided between the wheel-tire and the brake-spoon.

A further object is to modify or multiply the movement of the brake-spoon imparted thereto by the movement of the normally slack side of the driving-chain, whereby the movement of the chain necessary to impart the desired movement to the brake-spoon is reduced to the minimum.

Other objects of my invention are simplicity, durability, lightness, and strength of the brake device and ease of attachment of the same to all kinds of bicycles and regardless of the shape of the tubing in cross-section.

The foregoing and such other objects as may hereinafter appear are attained by the device illustrated in the accompanying drawings, in which—

Figure 1 illustrates a portion of a bicycle, showing my brake applied thereto but out of action. Fig. 2 is a similar view, but showing the brake in action. Fig. 3 represents a plan view of the brake. Fig. 4 represents a front elevation thereof. Figs. 5, 6, and 7 represent detail views illustrating my new clip for attaching the brake to different shapes of tubing. Figs. 8, 9, 10, and 11 represent detail views, Fig. 9 being a section on the line 9 9 of Fig. 8, Fig. 10 being a section on the line 10 10 of Fig. 1, and Fig. 11 being a sectional view on the line 11 11 of Fig. 10.

Similar letters of reference indicate corresponding parts in the several figures of the drawings.

I may here state that while I have illustrated and will describe my brake in connection with a bicycle the usefulness thereof is not limited to such application, for it may obviously be employed in connection with any chain-driven vehicle without materially departing from the spirit of my invention.

Referring by letter to the accompanying drawings, A indicates the rear fork of a bicycle, B the sprocket-wheel, C the drive-chain, and D the wheel-tire, all of which may be of any desired form or dimensions.

Secured to the fork is a hanger E, from which is suspended a double toggle F, carrying a brake-spoon G in position to be applied to the tire, and a roller H in position to be engaged and actuated by the chain upon a vertical or lateral movement of the normally slack side thereof.

The double toggle comprises the arms $a\,a$ and $b\,b$, the upper pair of which are permanently pivoted at $c$ to the hanger E and the lower pair of which are pivotally connected together by a bar $d$, which at one end is extended to form a crank-arm $e$, upon which is mounted the roller H. The bar $d$ passes freely through the end of the arm $b$, but is rigidly secured in any suitable manner to the lower arm $a$, preferably by means of a clamp $f$, whereby both the vertical and horizontal positions of the roller H may be changed when desired in fitting the brake to a wheel, but which enables the securing of the roller H rigidly in any adjusted position with reference to the arm $a$.

Upon the pivot connecting the arms $a\,a$ of one of the toggles is loosely mounted an ear $g$, rigidly secured to and projecting from the spoon G, said ear being arranged to engage a shoulder $x$ on the lower arm, as shown more clearly in Fig. 11, which serves as a stop to hold the spoon in a generally upright position; but by reason of the loose pivoting of the spoon upon its pivotal support it has a sufficient play to readily adapt itself to the tire when applied, so that the full surface thereof will engage the tire.

For the purpose of promptly releasing the brake or retracting the same to its normal position after being applied I provide a coil-spring $h$, sleeved upon the pivot connecting the arms $b\,b$ of the other toggle, the ends of which spring bear, respectively, upon the arms of the toggle with a force tending to straighten the same out, and this force, assisted by the gravity brake device as a whole, when released by the chain promptly withdraws the brake-spoon from contact with the tire. One end $h'$ of the spring $h$ is preferably bent over, so as to form a cushion against which one of the arms $a\,a$ will strike and bear when the brake is retracted and out of action, so as to prevent the noise resulting from the contact of metal upon metal, this means being exceedingly simple and effective for this purpose. Other means may of course be provided, and, indeed, the spring as well as the cushion may be located at another point in the device without departing from the spirit of my invention, such as at the pivotal point $c$, where the toggles connect with the hanger.

It will here be well to note that while I have for convenience denominated the arms $a\,a$ and $b\,b$ as comprising a "double toggle" such statement is not strictly correct as applied to the construction shown, for the arms $a\,a$ only are shown to constitute a toggle, while the upper arm of the other toggle is shown as a rigid arm, forming an integral part of the hanger E; but in view of the fact that said upper arm of the toggle $b\,b$ may obviously be a pivoted arm arranged to normally rest against a stop $y$ on the hanger, as clearly shown in Figs. 8 and 9, and in view of the further fact that the entire toggle $b\,b$ may be dispensed with without departing from the spirit of my invention, I have deemed it best to describe the same as a "toggle." The use of the toggle $b\,b$, however, in connection with the toggle $a\,a$ is preferred, because of the greater rigidity of the parts as against the torsional strain to which they are subjected in the application of the brakes and because of the greater and desirable stiffness of the device as a whole when out of action, which serves to promote the noiselessness thereof.

It is also obvious that so far as regards the application and operation of my brake the toggle, and consequently the whole device, may be attached to the wheel-frame in any suitable manner, and any wheel-frame may be especially and permanently adapted for the use of this brake, which would of course then never need but one adjustment, by providing a fixed lug or ear on the frame of the machine, to which the toggle can be pivotally connected. In this connection it will be perfectly apparent that the upper arm of the toggle $b$ might form an integral part of such lug, or it might be pivoted to the lug with a suitable stop provided on the lug, or if the toggle $b\,b$ as a whole be dispensed with a stop for the other toggle could be provided on the lug in a manner that will readily suggest itself to any skilled mechanic. The rigidity and immovability of the upper arm of the toggle $b\,b$ is a desirable feature, however, because it greatly aids in holding the brake in position against vibration when out of action. However, to adapt the brake for application to different bicycles, so that it may be commercially sold as a bicycle accessory, I provide the hanger E, consisting of a U-shaped bar the side arms of which are disposed as near as possible at the standard angle of the fork-arms, so as to lie along the under side of the fork-arms. The side arms $i$ are also of such a length that they may be easily sprung in or out to fit the usual slight variations in the angle of the fork-arms and are provided upon their ends with clips whereby they may be readily and adjustably secured to the rear fork. To this end the arm terminates at its end in a transversely-curved socket $j$, having a laterally-disposed eye $k$, through which extends a hook-bolt $l$, having a curved socket

*m* on one end thereof, opposing the curved socket *j*, and being screw-threaded at its opposite end to receive a nut *n*, by which the bolt may be caused to firmly clasp the fork. The commercial value of this clip will be readily appreciated when it is understood that the tubing of which the rear forks of different wheels are now made is in some cases circular, as illustrated in Fig. 5, in other cases is oval, as is illustrated in Fig. 6, and in other cases is D-shaped, as illustrated in Fig. 7. By the use of my clip the brake may be as readily, quickly, and easily applied to one shape of tubing as to the other without any change or modification. This feature, though of slight mechanical importance, is of the utmost commercial importance, in that without such adaptability to all kinds of frames a brake perfectly satisfactory and effective in every other respect cannot be commercially sold as a bicycle accessory to the general trade, and hence the usefulness thereof upon the vast number of bicycles already in use would be materially lessened.

I am aware that numerous changes in the form and proportions of my brake device may be made to fulfil different requirements as to strength and size; but all such changes would be obvious to one skilled in the art to which my invention appertains and would fall within the purview of my invention.

A brake device such as is herein illustrated and described possesses may advantages over any other form of brake device known to me, among which may be mentioned the rigidity, stiffness, and noiselessness of the device, whether in or out of action, the lightness thereof, and the simplicity of this construction, which yet affords all of the adjustments necessary to adapt the brake for use in connection with the various bicycles now in use or being put upon the market. One of the principal advantages, however, is the great movement which may be imparted to the brake-spoon by a very slight vertical or lateral movement of the normally slack side of the driving-chain. I have found from practical experience and investigation that many riders prefer to sacrifice power in overcoming friction in order to have the driving-chain as tight as possible, and it is not uncommon for riders to have only a quarter to a half-inch slack in their chains and some even less. With any of my former constructions ample brake-power can be secured by a movement of only an eight of an inch; but to do so requires the brake-spoon to normally stand in such close relation to the tire as to quickly clog when the wheel is used upon muddy streets. This objection, however, is entirely overcome by my present invention, for in my present device the movement, both lateral and longitudinal, of the chain, operating to run the roller backward on the chain as well as lift the same, is multiplied on the brake-spoon, so that as the parts are proportioned in the drawings the brake-spoon will have a forward movement about double the vertical lift imparted to the roller by the lateral movement of the driving-chain. Part of this gain is due to the longitudinal run of the roller on the chain, and the rest of it is due to the expansion or buckle of the toggle. In other words, if, say a quarter of an inch of slack be taken out of the drive-chain by back-pedaling, so that the chain in Fig. 2 is a quarter of an inch higher than in Fig. 1, the brake-spoon will move forward, say a half-inch, and hence they normally stand practically a half-inch away from the tire, so as to absolutely avoid the possibility of clogging under any ordinary conditions.

Of course the position of the brake with relation to the tire will have to be adjusted according to the slack in the drive-chain, which may be more or less than instanced above, and by differing the proportions of the parts still greater differences in movement may be obviously attained.

By means of the clip on the hanger E the position of the brake device as a whole, and especially of the brake-spoon, with relation to the wheel-tire may be easily and accurately adjusted, while the bar *d* affords a ready and accurate means for both vertical and horizontal adjustment of the roller H, so that it may be arranged in proper position for engagement with the driving-chain.

While it is preferable to have the roller H mounted upon the crank extension of the bar *d*, obviously such crank extension may be dispensed with and the roller mounted axially upon the bar *d*, which would simply result in destroying the vertical adjustability of the chain-engaging roller; but such function would not be of great importance if the brake were specially for application to any particular wheel.

Having thus fully described my invention, what I claim, and desire to secure by Letters Patent, is—

1. In a brake for chain-driven vehicles the combination, with a toggle pivoted, at one end, to the vehicle-frame and arranged to be engaged, at its free end, by the driving-chain, of a brake-spoon secured to the toggle between its ends, substantially as described.

2. In a brake for chain-driven vehicles the combination, with a toggle pivoted, at one end, to the vehicle-frame and arranged to be engaged, at its free end, by the driving-chain, of a brake-spoon loosely mounted on the pivot connecting the toggle-arms, substantially as described.

3. In a brake for chain-driven vehicles the combination, with a toggle pivoted at one end to the vehicle-frame and a chain-engaging device adjustably secured to the free end of the toggle, of a brake-spoon secured to the toggle between its ends, substantially as described.

4. In a brake for chain-driven vehicles the combination, with a toggle pivoted at one end to the vehicle-frame and a chain-engaging device adjustably secured to the free end of the toggle, of a brake-spoon loosely mounted on the pivot connecting the toggle-arms, substantially as described.

5. In a brake for chain-driven vehicles the combination, with a toggle pivoted at one end to the vehicle-frame and a chain-engaging device secured to the free end of the toggle and vertically as well as horizontally adjustable thereon, of a brake-spoon secured to the toggle between its ends, substantially as described.

6. In a brake for chain-driven vehicles the combination, with a pair of toggles pivoted, at one end, to each other and to the vehicle-frame and, at their free ends, pivoted together and arranged to be engaged by the driving-chain, of a brake-spoon secured to one of said toggles between its ends, substantially as described.

7. In a brake for chain-driven vehicles the combination, with a pair of toggles adjustably pivoted, at one end, to each other and adjustably pivoted to the vehicle-frame and a chain-engaging device adjustably secured to the free ends of said toggles, of a brake-spoon secured to one of said toggles between its ends, substantially as described.

8. In a brake for chain-driven vehicles the combination, with a pair of toggles pivoted, at one end, to each other and adjustably pivoted to the vehicle-frame and a chain-engaging device adjustably secured to the free ends of said toggles, one arm of one of said toggles being rigid, of a brake-spoon secured to the other of said toggles between its ends, substantially as described.

9. In a brake for chain-driven vehicles the combination, with a toggle pivoted, at one end, to the vehicle-frame and arranged to be engaged, at its free end, by the driving-chain, of a brake-spoon secured to the toggle between its ends, and a spring bearing upon said toggle for normally holding the spoon out of contact with the wheel-tire, substantially as described.

HERBERT L. BAILEY.

Witnesses:
 WM. O. BELT,
 W. R. OMOHUNDRO.